Sept. 4, 1951     E. J. FARKAS     2,566,518
AUTOMATIC TRANSMISSION

Filed Dec. 22, 1945     5 Sheets-Sheet 1

E.J. FARKAS
INVENTOR.

BY
ATTORNEYS.

E. J. FARKAS
INVENTOR.

ATTORNEYS.

Sept. 4, 1951           E. J. FARKAS           2,566,518

AUTOMATIC TRANSMISSION

Filed Dec. 22, 1945           5 Sheets-Sheet 3

E. J. FARKAS
INVENTOR.

BY C. C. McRae
R. D. Harris
John R. Faulkner
T. H. Oster
ATTORNEYS.

Sept. 4, 1951  E. J. FARKAS  2,566,518
AUTOMATIC TRANSMISSION
Filed Dec. 22, 1945  5 Sheets-Sheet 4

E. J. FARKAS
INVENTOR.

ATTORNEYS.

Sept. 4, 1951 E. J. FARKAS 2,566,518
AUTOMATIC TRANSMISSION
Filed Dec. 22, 1945 5 Sheets-Sheet 5

E. J. FARKAS
INVENTOR

BY
G. C. McRae
R. D. Harris
John R. Faulkner
T. H. Oster

ATTORNEYS

Patented Sept. 4, 1951

2,566,518

UNITED STATES PATENT OFFICE 2,566,518

AUTOMATIC TRANSMISSION

Eugene J. Farkas, Detroit, Mich., assignor to Ford Motor Company, Dearborn, Mich., a corporation of Delaware Application December 22, 1945, Serial No. 636,958

17 Claims. (Cl. 74—732)

This invention relates generally to a transmission, and more particularly to a vehicle transmission of the automatic type.

The present invention comprises an improvement of the automatic transmission disclosed in my co-pending application, Serial No. 611,975, filed August 22, 1945, now Patent #2,528,584, November 7, 1950. The transmission of the said co-pending application includes a multiple planetary gearing system adapted to transmit torque at three different speed ratios, with the transition from first to second speed, and from second to third speed, taking place automatically by the operation of second and third speed clutches which are activated by fluid under pressure supplied by a fluid pump and regulated by governor-controlled hydraulic valve means. This transmission also incorporates a fluid coupling, operative in low and reverse speeds, but bypassed in second and third speed ratios. In the co-pending application, manually operable means are provided for shifting the transmission from neutral to forward speed and from neutral to reverse speed, including a pair of bands engageable with drums provided on a clutch carrier and a planet carrier respectively. The use of bands involves certain inherent disadvantages, including the necessity for frequent adjustments, replacement due to wear, heat due to friction between the band and drum, and slippage and possibly improper operation due to poor adjustment or a combination of the characteristics mentioned above.

In the present invention these disadvantages are overcome by providing the clutch carrier and the planet carrier with external gear teeth and by mounting a pair of swingable yokes having diametrically opposed internal teeth in such a manner that the yokes may be moved into meshing engagement with the teeth on the clutch carrier and the planet carrier to positively lock the latter against rotation. The forward speed shifter yoke and the reverse speed shifter yoke are coupled together for coordinated movement, and are actuated by a single control lever so that the transmission may be placed in forward or reverse speed by movement of the actuating lever in opposite directions from a neutral position. The advantages of this construction are that the clutch carrier and planet carrier are positively locked against rotation and no slippage can occur, that no adjustment is necessary, and that there is no heat loss due to friction. As a result, positive action is assured and the possibility of failure is greatly reduced.

An inherent characteristic of transmissions having a fluid coupling incorporated therein is the tendency of the transmission and the vehicle to "creep" when the engine is idling, due to the transfer of fluid from the impeller to the runner of the fluid coupling. The present invention eliminates "creep" at idling speeds by the provision of an anti-creep brake engageable with a drum carried by the clutch carrier. The brake is vacuum powered and includes a valve connected to the accelerator linkage in such a manner that during idling speeds the vacuum source is automatically connected to a diaphragm chamber arranged to move the brake into frictional engagement with the drum. An advantageous feature of the construction resides in the provision of means whereby the brake will automatically be released upon a very slight movement of the accelerator pedal to immediately release the clutch carrier and permit the normal forward movement of the vehicle. A small amount of lost motion is usually present in the accelerator linkage and it is during the movement of the accelerator pedal required to take up this lost motion that the anti-creep brake valve is operated to shut off the vacuum supply and to open the diaphragm chamber to atmosphere to release the brake. The required fast action of the valve is secured by providing a rotatable valve disc with a cavity on its inner face terminating on a radial line and adapted to overlap a passage formed in the valve body, the latter passage also having a radial edge adjacent the cavity in the valve disc. With this construction only a slight overlapping of the valve passages is necessary to secure an opening of sufficient area to supply the vacuum necessary to operate the brake, and consequently this opening can be closed by a slight angular movement of the valve disc.

In the construction disclosed in the present invention, the anti-creep brake has an additional function besides preventing creep due to the torque transmitted through the fluid coupling during idling, namely, to momentarily stop the rotation of the clutch carrier to facilitate the movement of the reverse speed shifter yoke into engagement with the gear teeth provided on the carrier. Although a similar synchronizing mechanism can be used in connection with the forward speed shifter yoke, it has been found that the inherent inertia and frictional resistance of the planetary transmission between the clutch carrier and the planet carrier is such as to make it possible during idling speeds to engage the yoke with the teeth on the planet carrier without clashing the gear teeth.

Other objects and advantages of the invention will be made more apparent as this description proceeds, particularly when considered in connection with the accompanying drawings in which.

Figure 1:
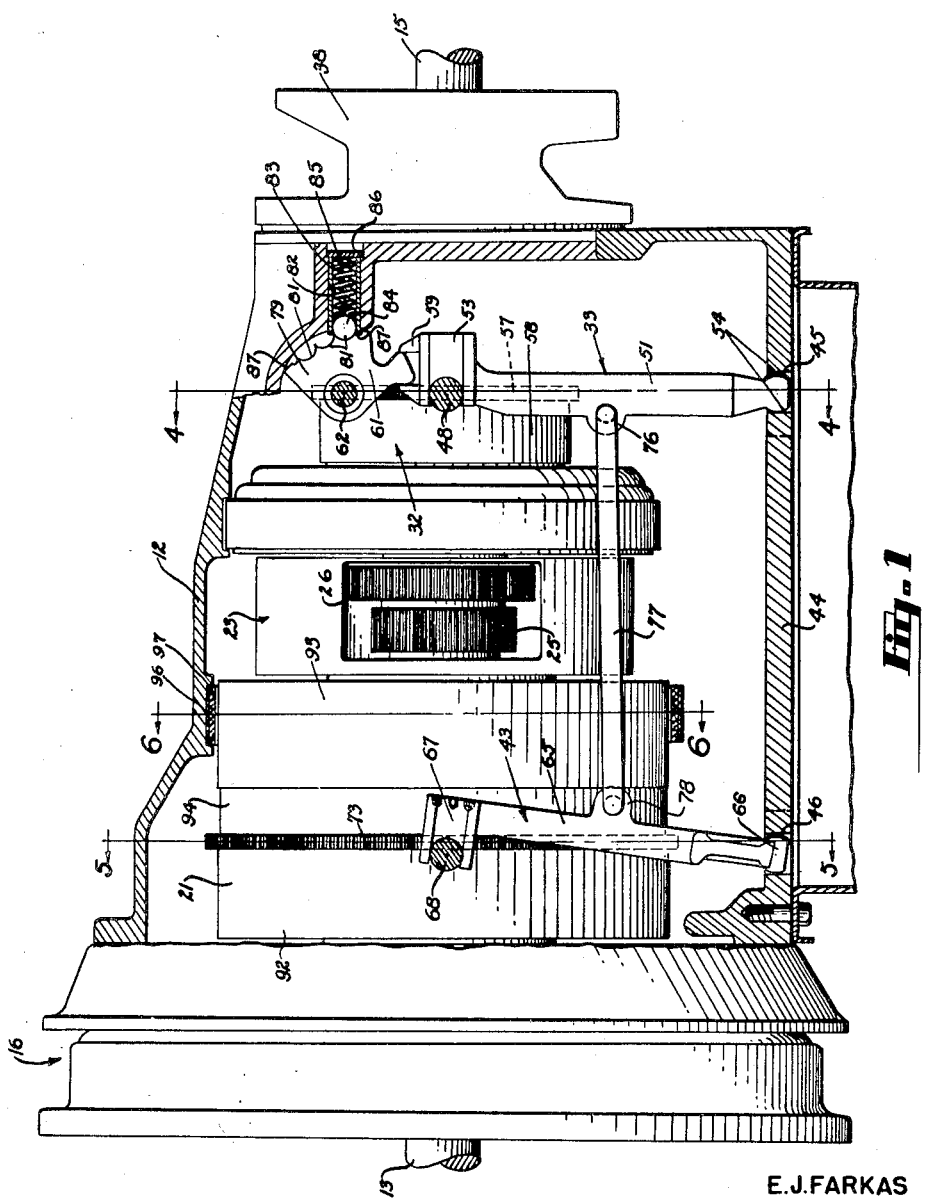
Figure 1 is a side elevation, partly broken away, of a transmission embodying the present invention.
Figures 4, 5:
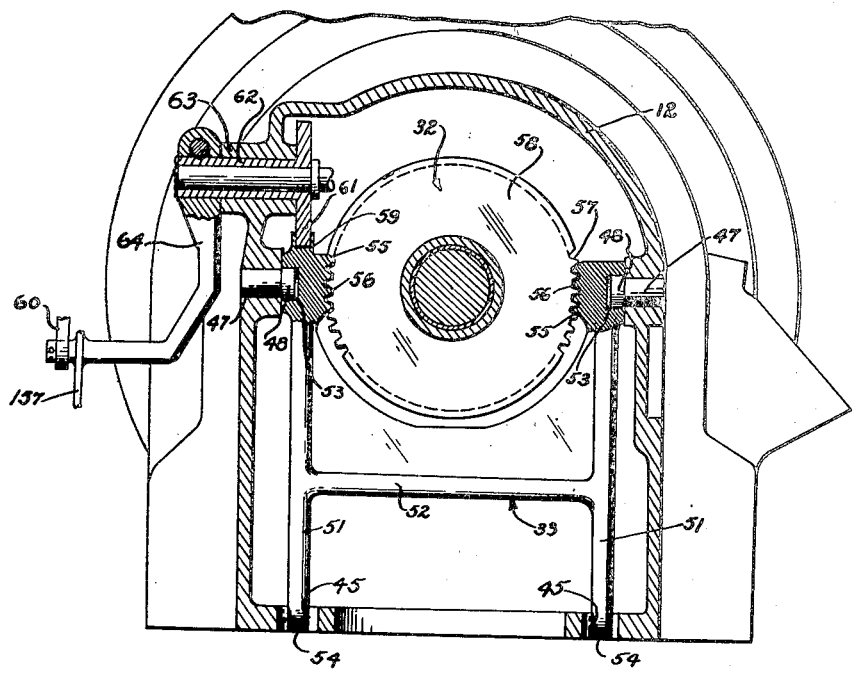
Figure 6:
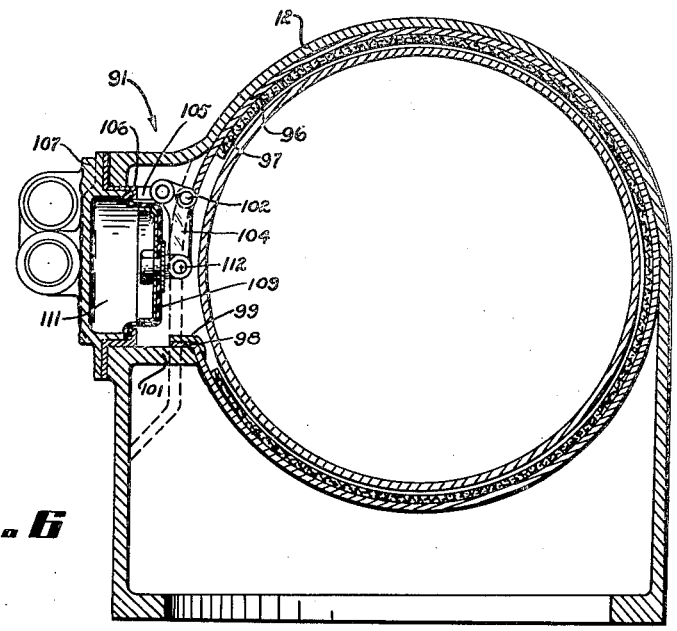

Figures 4, 5 and 6 are transverse cross-sectional views taken substantially on the lines 4—4, 5—5 and 6—6 of Figure 1.

Figures 7, 8:
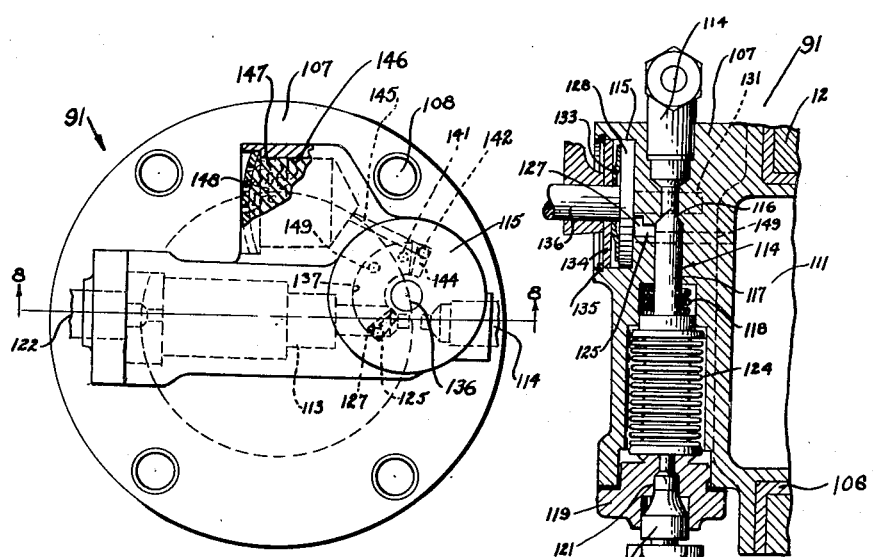

Figure 7 is an enlarged side elevation of the valve mechanism for the anti-creep brake.

Figure 8 is a cross-sectional view taken substantially on the line 8—8 of Figure 7.

Figure 9:
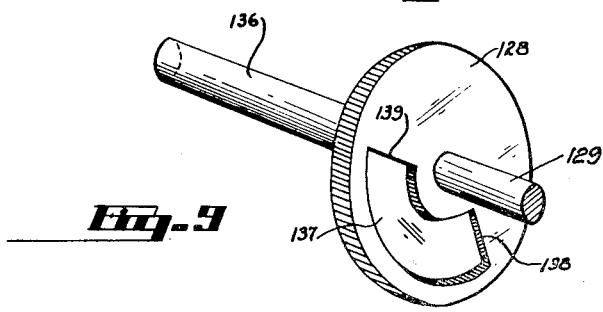

Figure 9 is a perspective view of the valve disc.

Figure 10:
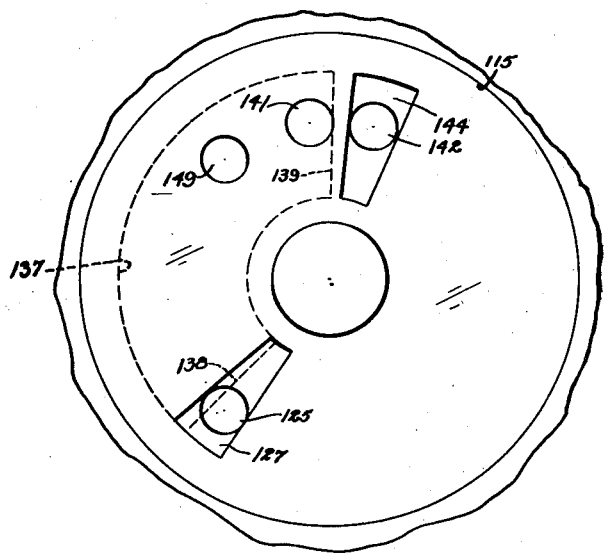

Figure 10 is an enlarged elevation of the valve body with the valve disc removed, showing in dotted lines the cavity in the rotary valve disc in the idling position of the latter.

Figure 11:
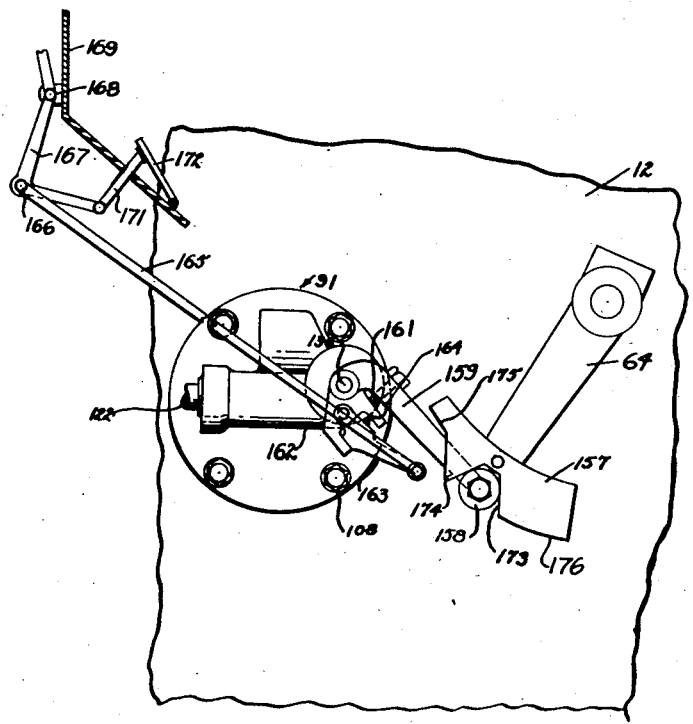

Figure 11 is a fragmentary side elevation of the transmission, partially diagrammatical, illustrating the linkage for operating the anti-creep brake valve and the shifter yokes.

Figure 2:
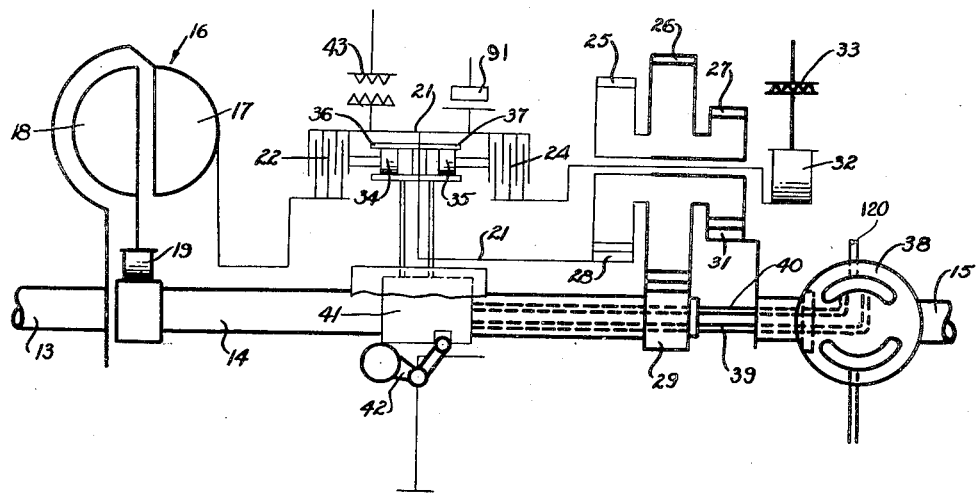
Figures 2 and 3 are longitudinal vertical schematic drawings of the transmission, illustrating the power flow therethrough in first speed forward and in reverse speed, respectively.
Figure 3:
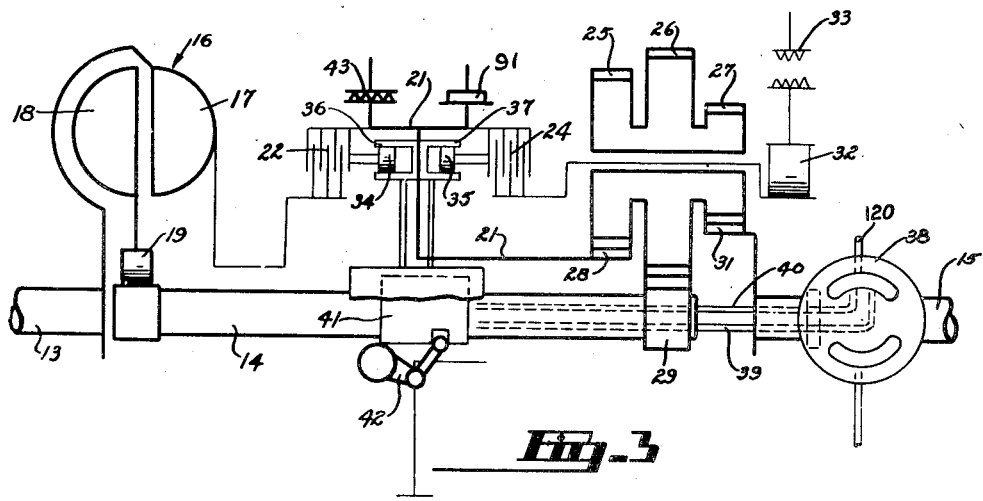

It will be noted that the general construction of the automatic transmission is shown schematically in Figures 2 and 3 of the drawing, reference being made to the above mentioned copending application for a more detailed description and illustration of the mechanism.

Referring now to the drawings, and particularly to Figures 1, 2 and 3, there is shown an automatic transmission housed within a casing 12, and having a drive shaft 13 adapted to be connected to the engine crankshaft, a main shaft 14, and a load shaft 15 adapted to be connected to the rear axle drive means of the vehicle. The transmission includes a fluid coupling 16 having an impeller 17 driven by the drive shaft 13, and a runner 18 connected to the main shaft 14 through an overrunning clutch 19.

The impeller 17 of the fluid clutch is adapted to be operatively connected to a clutch carrier 21 by means of a second speed clutch 22. The clutch carrier 21 is also adapted to be locked to a planet carrier 23 by means of a third speed clutch 24. The second and third speed clutches are adapted to be actuated automatically by hydraulic mechanism to be described later.

The planet carrier 23 is mounted for rotation about the axis of the main shaft 14 and carries clusters of planet pinions 25, 26 and 27. Planet pinions 26 mesh with a sun gear 29 mounted on the mainshaft 14, and planet pinions 27 mesh with sun gear 31, the latter being carried by the load shaft 15. In order to transmit torque through the multiple planetary gearing system in the forward direction, an overruning clutch 32 is connected to the planet carrier 23. The overrunning clutch is adapted to be selectively connected to the transmission casing by the forward speed shifter yoke 33, to be described more in detail hereinafter.

The second and third speed clutches 22 and 24 are actuated by pistons 34 and 35 housed within cylinders 36 and 37 respectively. Fluid under pressure for operating the second and third speed clutches is supplied by a fluid pump 38 driven by the load shaft 15 and transmitted through conduits 39 and 40 respectively.

The flow of fluid through conduits 39 and 40 is controlled by a sleeve valve 41, the position of which is regulated by a centrifugal governor 42 mounted on the clutch carrier 21. In low speed, the governor controlled valve 41 blocks the flow of fluid through conduits 39 and 40 and, accordingly, neither the second or third speed clutch is operated. Power is then transmitted from the drive shaft 13 through the fluid coupling 16 to the main shaft 14, and then through sun gear 29, planet pinions 26 and 27, and sun gear 31 to the load shaft 15, driving the latter in the forward direction at low or first speed.

The transmission is automatically shifted to second speed as the rotational speed of the clutch carrier 21 increases. The increase in speed results in radial displacement of the centrifugal governor 42 and axial displacement of the sleeve valve 41, opening conduit 39 and admitting fluid under pressure to the second speed clutch cylinder 36. Actuation of the second speed clutch 22 by piston 34 is effective to lock the drive shaft 13 and the impeller 17 of the fluid coupling to the clutch carrier 21. The clutch carrier drives sun gear 28 carried thereby and, through planet pinions 25 and 27 and sun gear 31, is effective to rotate the load shaft 15 at an intermediate or second speed ratio.

When the rotational speed of the clutch carrier 21 has increased a further predetermined amount, the governor controlled sleeve valve 41 is shifted to a position establishing fluid communication through conduit 40 to the third speed clutch cylinder 37. Piston 35 in the cylinder actuates the third speed clutch 24 and results in the rotation as a unit of the clutch carrier, planet carrier, and triple planetary pinion. Accordingly, a direct drive is established from the drive shaft 13 to the load shaft 15, transmitting torque at engine speed in the forward direction.

It will be apparent from the foregoing description that the second and third speed clutches 22 and 24 are automatically operated by fluid pressure supplied from the pump 38, and effect an automatic transition between first, second and third speeds. During operation of the transmission in first, second and third speeds forward, the forward speed shifter yoke 33 is interlocked with the planet carrier 23 to connect the overrunning clutch 32 to the transmission casing 12 and prevent reverse rotation of the planet carrier.

Referring now particularly to Figure 3, the transmission of power through the transmission in reverse speed is shown in heavy lines. A reverse speed shifter yoke 43, described more in detail hereinafter, is adapted to be manually operated to lock the clutch carrier 21 against rotation. Power is then transmitted from the drive shaft 13 to the impeller 17 of the fluid coupling and by fluid reaction to the runner 18 and then through the overrunning clutch 19 to the main shaft 14. As in first speed forward, the sun gear 29 drives the planet pinion 26 and, of course, the other planet pinions 25 and 27 are also rotated. However, the forward speed shifter yoke 33 is now released so that the planet carrier 23 is free of the restraint of the overrunning clutch 32. The reverse speed shifter yoke 43 is engaged, locking the clutch carrier 21 and its sun gear 28. The gearing now functions as a planetary system and reverse rotation at low speed ratio and maximum torque is imparted to the load shaft 15 through the planet pinions 27 and sun gear 31.

The forward and reverse speed shifter yokes 33 and 43 and associated mechanism will now be described more in detail. As best seen in Figures 1, 4 and 5, the base flange 44 of the transmission casing 12 is provided with a pair of transversely spaced apertures 45 adjacent its rearward end and a similar pair of transversely spaced apertures 46 adjacent its forward end. Vertically above the apertures 45, a pair of guide pins 47 are fixedly mounted in the casing and have heads 48 extending inwardly. The guide pins 47 and the apertures 45 provide supporting and guiding means for the forward speed shifter yoke 33.

The yoke 33 comprises a pair of upright side members 51 inter-connected by a transversely extending rib 52. The side members 51 have horizontal guide ways 53 adjacent their upper ends slideably engageable with the heads 48 of the guide pins 47. At their lower ends, the side members 51 of the yoke are formed with forward and rearward semi-spherical surfaces 54 received within the apertures 45 and permitting pivotal movement of the yoke.

Extending inwardly from the side members 51 of the yoke are a pair of narrow flanges 55 formed with gear teeth 56 on their inner edges. The gear teeth 56 are formed on a pitch diameter corresponding to the pitch diameter of the gear teeth 57 provided on the outer periphery of the hub 58 of the overrunning clutch 32. It will be apparent that swinging movement of the yoke 33 about the lower ends of its side members 51 is effective to move the gear teeth 56 on the yoke into engagement with the gear teeth 57 on the hub. Both the gear teeth 56 and 57 are relatively narrow in an axial direction, so that only a small angular movement of the yoke is necessary to move the teeth into and out of meshing engagement. With the teeth meshed, the hub 58 of the overrunning clutch 32 is effectively locked against rotation and, as described above, reverse rotation of the planet carrier 23 is prevented.

Above the guide way 53 formed in one of the side members 51 of the yoke, the side member is formed with a shifting fork 59, adapted to be engaged by a shifting lever 61 formed integrally with a hollow shaft 62 journaled in boss 63 formed on the transmission casing. An actuating lever 64 is keyed to the shaft 62 and suitably connected by a link 60 to a control (not shown) preferably located upon the steering column of the vehicle.

The reverse speed shifter yoke 43 is similar to yoke 33, and has side members 65 provided with semi-spherical shaped lower ends 66 pivotally supported in the apertures 46 formed in the base flange 44 of the transmission casing. Guideways 67 formed in the upper ends of the side members 65 of the yoke are slideably engageable with the heads 68 of guide pins 69 mounted in the side walls of the transmission casing vertically above the apertures 46. Opposed flanges 71 extend inwardly from the side members 65 and carry teeth 72 adapted to be engaged with teeth 73 formed on the outer periphery of the clutch carrier 21.

One of the side members 51 of the forward speed yoke 33 is provided with a boss 76 having an aperture receiving one end of a connecting rod 77, the opposite end of which is received within an aperture formed in a boss 78 on one of the side members 65 of the reverse speed yoke 43. It will now be apparent that the forward and reverse speed yokes are interconnected for simultaneous actuation by the shifting lever 61. As best seen in Figure 1, the shifting lever 61 has a segment 79 provided on its periphery with a series of three notches 81. Adjacent the segment 79, the transmission casing is provided with a bore 82 housing a sleeve 83, the latter containing a ball 84 which is urged by a coil spring 85 toward the segment 79 of the shifting lever. A suitable welch plug 86 retains the sleeve 83 and the spring 85 in position. Shoulders 87 at opposite ends of the segment 79 are arranged to engage the inner end of the sleeve 83 to form stops limiting the annular movement of the shifting lever.

Engagement of the spring urged ball 84 with the notches 81 of the shifting lever provides for indexing the latter between neutral, forward speed and reverse speed. In the central position of the shifting lever 61, both the forward and reverse speed yokes 33 and 43 are disengaged from the gear teeth on the clutch carrier 21 and the overrunning clutch 32, and the transmission is in neutral. Movement of the actuating lever 64 to rotate the shifting lever 61 in a counter-clockwise direction to the position shown in Figure 1 is effective to swing the forward speed yoke 33 to the right and to engage the gear teeth 56 on the yoke with the gear teeth 57 on the hub 58 of the overrunning clutch, placing the transmission in forward speed, after which the transmission is automatically variable between first, second and third speeds according to the particular speed requirements. Movement of the actuating lever 64 in a clockwise direction from the neutral position is effective through the shifting lever 61 to swing both the forward speed yoke 33 and the interconnected reverse speed yoke 43 to the left, as seen in Figure 1, and to engage the gear teeth 71 on the reverse speed yoke with the gear teeth 73 on the clutch carrier 21. It will be seen that the above described construction provides a positively controlled mechanism for placing the transmission in neutral, forward or reverse speed as desired without the necessity of using bands.

In order to prevent "creep" of the transmission and the vehicle when idling, and also to momentarily stop the rotation of the clutch carrier to facilitate shifting the transmission into reverse speed, the present invention provides an anti-creep brake mechanism indicated generally at 91 and best shown in Figures 6 to 10 inclusive. The clutch carrier 21, as shown in Figure 1, includes a pair of annular members 92 and 93 positioned on opposite sides of the body 94 of the clutch carrier and secured together. The annular member 92 carries the gear teeth 73 which are engageable with the gear teeth on the reverse speed shifter yoke 43, as hereinbefore described. The annular member 93 forms the brake drum of the anti-creep brake mechanism 91. A flexible metallic brake band 96 encircles the drum 93 and carries on its inner surface a friction lining 97. One end of the brake band 96 is bent outwardly to form an anchoring flange 98 which is reinforced by ribs 99 to strengthen the flange. The anchoring flange 98 is adapted to rest upon a horizontal wall 101 of the transmission casing 12 and is slideably movable along the wall for engagement with the brake drum.

The opposite end of the brake band is pivotally connected at 102 to a bell crank actuating lever 104. The short arm of the bell crank lever 104 is pivotally mounted upon a clevis 105 welded to a flange of the diaphragm retainer 106. The diaphragm retainer 106 and the valve body 107 are bolted to the transmission casing by bolts 108, and, together with a flexible rubber diaphragm 109 clamped therebetween, form a diaphragm chamber 111. A clevis 112 is secured to the diaphragm and pivotally connected to the long arm of the bell crank lever 104. It will be apparent in Figure 6 that when the diaphragm chamber 111 is opened to communication with a source of vacuum power, such as the engine manifold, the diaphragm is moved outwardly of the casing 12, actuating the lever 104 to frictionally engage the brake lining 97 with the brake drum 93 to hold the clutch carrier 21 against rotation. Upon release of the vacuum power, and the opening of the diaphragm chamber to atmosphere, the brake band is released and due to its inherent resiliency will become disengaged from the brake drum.

The valve body 107 is provided with a horizontal stepped bore 113 communicating at one end with a source of vacuum power, such as the engine manifold, through a fitting 114. A second bore 115 is formed in the valve body at right angles to the bore 113 and slightly offset therefrom. Intermediate its ends the stepped bore 113 is formed with a valve seat 116 adapted to be closed by a plunger 117 normally urged toward open position by a spring 118. The opposite end of the bore 113 is closed by a plug 119 having a passage 121 therethrough communicating through a fitting 122 and a conduit 123 with the inlet 120 of the fluid pump 38 of the transmission. A bellows or sylphon 124 is secured at its lower end to the plug 119 and at its upper closed end abuts the head of the plunger 117. Upon the application of fluid pressure the sylphon expands, moving the plunger 117 against the action of the spring 118, closing the valve seat 116 and blocking the admission of vacuum power.

Normally, when the engine is idling, the fluid pump 38 driven thereby generates insufficient fluid pressure to overcome the action of spring 118 and, as a result, the plunger is maintained in open position, permitting the vacuum in the upper portion of the bore 113 to be transmitted past the valve seat 116 to a vacuum inlet 125. As best seen in Figures 8 and 10, the vacuum inlet 125 communicates with the bore 113 and at its outer end opens into an enlarged wedge-shaped cavity 127, the opposite walls of which are arranged substantially radially of the bore 115.

A rotary valve 128 is received within the bore 115 and has a pilot 129 extending inwardly into a bore 131 to support the valve and insure proper alignment between the adjacent faces of the valve and the valve body. The valve 128 is held in position in the bore by spring 133, washer 134 and snap spring 135. A valve shaft 136 is formed integrally with the valve and is connected to the accelerator linkage of the vehicle, as described more in detail hereinafter.

The face of the valve 128 is formed with an arcuate cavity 137, Figures 9 and 10, having radially extending end walls 138 and 139. Rotary movement of the valve 128 in a counterclockwise direction in Figure 7 is limited by a stop 141 mounted on the valve body, and in its extreme position the radial end wall 138 of the valve cavity 137 overlaps the adjacent radial wall of the vacuum inlet cavity 127 in the valve body. Inasmuch as the cavities have a considerable radial extent, only a very small angular overlap is necessary to obtain a sufficient area of communication between the cavities for the transmission of sufficient vacuum power to the diaphragm chamber to actuate the anti-creep brake. In the present instance an overlap of approximately 4° has been found to be sufficient for this purpose. As a result of this construction only a slight angular movement of the valve 128 is necessary to completely close the vacuum supply to the diaphragm chamber.

An atmospheric inlet 142 is formed in the valve body and has an enlarged wedge-shaped cavity 144 opening toward the rotary valve 128. As best seen in Figure 7, the atmospheric inlet 142 communicates by means of a passage 145 in the valve body with an enlarged bore 146 containing a suitable filtering media 147. The open end of the bore 146 is closed by an apertured plug 148.

It will be noted from Figure 10 that the side walls of the wedge-shaped atmospheric cavity 144 extend radially and that the adjacent wall of the cavity is spaced from the end wall 139 of the valve cavity 137 an angular distance equal to the overlap existing between the valve cavity 137 and the vacuum inlet cavity 127 when the valve is in its idling position against stop 141. Angular movement of the valve 128 in a clockwise direction is thus effective to close communication between the valve cavity 137 and the vacuum inlet 125 and simultaneously to establish communication between the valve cavity and the atmospheric inlet 142. The valve cavity 137 communicates at all times with the diaphragm chamber 111 through a horizontal passage 149 which alternately opens to vacuum and to atmosphere depending upon the angular position of the valve.

The operation of the anti-creep brake mechanism is as follows. Under normal operating speeds in a forward direction the rotary valve 128, which is connected to the accelerator pedal of the vehicle, permits communication between the atmospheric inlet 142 and the diaghragm chamber 111 through the cavities 144 and 137 and the passage 149. Inasmuch as the fluid pump 38 is driven by the engine, it is generating fluid pressure which is supplied through the conduit 123, fitting 122 and passage 121 to the sylphon 124, which acts upon the plunger 117, closing the valve seat 116 and positively preventing the admission of vacuum power to the diaphragm chamber. With this construction, even though the accelerator pedal might be momentarily released while the vehicle is traveling at considerable forward speed, the plunger 117 will prevent the diaphragm chamber from being opened to vacuum which would apply the anti-creep brake. This is a safety feature, since the application of the anti-creep brake during substantial forward movement of the vehicle would not only disturb the operation of the transmission but would result in considerable wear.

When, however, the accelerator pedal is released and the vehicle speed has decreased to idling, the fluid pressure from the pump is insufficient to overcome the spring 118, and the plunger 117 is moved from the valve seat 116 permitting vacuum power to be admitted to the diaphragm chamber through the fitting 114, the stepped bore 113, the vacuum inlet 125, the cavity 127 and the horizontal passage 149. The initial movement of the accelerator pedal, when the vehicle is again started in the forward direction, is effective to rotate the rotary valve 128 in a clockwise direction, breaking communication between the vacuum inlet and the diaphragm chamber and establishing communication between the atmospheric inlet and the diaphragm chamber, thus releasing the brake. As previously mentioned, only a small angular movement of the valve is necessary to release the brake, and inasmuch as a certain amount of lost motion is always present in the accelerator linkage, the rotary valve is moved a sufficient amount to release the brake prior to the actuation of the carburetor by the accelerator linkage. As the vehicle speed increases, the pump 38 generates sufficient pressure to close the plunger 117, blocking the vacuum inlet and insuring the continued disengagement of the brake.

Referring now particularly to Figure 11, there is shown (partially diagrammatically) the linkage interconnecting the anti-creep brake mechanism 91 with the accelerator pedal. The actuating lever 64, which is connected by the hollow shaft 62 to the shifting lever 61 for the forward and reverse speed shifter yokes, is positioned exteriorly of the transmission casing and carries a cam 157 at its lower end. The cam 157 has a cam surface engageable with a cam follower 153 adjustably carried at the free end of a lever 159 journaled on the shaft 136 of the anti-creep valve. The lever 159 carries an adjustable screw 161 adapted to abut a bifurcated arm 162 secured to the valve shaft 136. Another lever 163 is pivotally mounted upon the bifurcated arm 162 and has an enlarged portion positioned between the furcations of the arm and forming a seat for a coil spring 164, which functions to urge the lever 163 in a clockwise direction against one of the furcations of the arm. The free end of the lever 163 is pivotally connected to one end of a connecting rod 165, the opposite end of which is pivotally connected at 166 to a lever 167. The lever 167 is pivotally mounted at 168 to the dash 169 of the vehicle body and is actuated by a link 171 extending from the accelerator pedal 172.

Normally the transmission is shifted from neutral to either forward or reverse speed while the engine is idling and, consequently while the anticreep brake is applied. Inasmuch as the anticreep brake holds the clutch carrier 21 against rotation, the reverse speed shifter yoke 43 can be moved into meshing engagement with the gear teeth 73 on the clutch carrier without clashing the latter, as might occur otherwise since the clutch carrier might have a small rotational speed during idling. It is possible, however, that the anti-creep brake may lock the clutch carrier in such a position that the teeth on the yoke are not in alignment with the teeth on the carrier. Even though the teeth are beveled at their forward edges, it might be difficult to properly mesh the gears under these conditions. In the present construction this possibility is eliminated by the construction shown in Figure 11 which functions to automatically release the anti-creep brake when the transmission is shifted either into forward or reverse speed.

It will be noted that the cam surface of the cam 157 contains a wedge-shaped depression 173 into which the cam follower on the lever 159 is seated when the shifting mechanism is in neutral. When, however, the actuating lever 64 is moved in a counterclockwise direction to shift the transmission into forward speed, the cam follower 158 is moved outwardly by the cam 157. It will be remembered that the lever 159 carrying the cam follower 158 is freely journaled on the valve shaft 136. The screw 161 on the lever 159, however, abuts the bifurcated arm 162, which is secured to the valve shaft, and thus the valve shaft and the rotary valve 128 are rotated, closing the vacuum inlet as previously described and releasing the anti-creep brake. After the cam follower 158 has passed the rise 174 in the cam surface the cam follower is returned to its original position against portion 175 of the cam surface. Thus it will be seen that the anti-creep brake is only released momentarily, to free the transmission gear train long enough to permit the forward speed yoke 33 to be moved into meshing engagement with the gear teeth 57 on the hub 59 of the overrunning clutch. After the meshing engagement has been completed, the anti-creep brake is again automatically applied to prevent the power transmitted by the fluid coupling from causing the transmission in the vehicle to creep while the vehicle is idling.

Movement of the actuating lever 64 for the shift mechanism in a clockwise direction to shift the transmission to reverse speed is also effective to move the cam follower 158 outwardly and to release the anti-creep brake in the same manner as when the mechanism is shifted into forward speed. It will be noted however that the cam 157 has an arcuate cam surface 176 of sufficient radial extent to maintain the cam follower in such a position that the anti-creep brake remains disengaged. Thus, as the transmission is shifted into reverse the anti-creep brake is released to permit the teeth on the reverse speed yoke 65 to move into meshing engagement with the teeth 73 on the clutch carrier even though they are not in perfect alignment.

The automatic operation of the anti-creep brake valve 128 by the shifting mechanism is accomplished without interfering with the position of the accelerator pedal or the connected linkage. As the bifurcated arm 162 is moved by the cam actuated lever 159, the spring 164 is compressed and the positions of the lever 163 and the connecting rod 165 leading to the accelerator pedal linkage are unchanged.

From the foregoing description it will be apparent that the controls for the anti-creep brake and the shifting mechanism are related and are combined in such a manner that satisfactory automatic operation of the transmission is affected.

It will be understood that the invention is not to be limited to the exact construction shown and described, but that various changes and modifications may be made without departing from the spirit and scope of the invention, as defined in the appended claims.

What is claimed is:

1. In a variable speed power transmission, in combination, a housing, a power shaft and a load shaft, a hydraulic unit arranged to transmit torque between said power and load shafts, a multiple planetary gearing system interposed between said power and load shafts, means associated with said planetary gearing system automatically operable under predetermined conditions to change from one speed ratio to another, a rotatable member associated with said planetary gearing system and adapted when retarded to condition said planetary gearing system to transmit torque in reverse speed, a second rotatable member associated with said planetary gearing system and adapted when retarded to condition said planetary gearing system to transmit torque in forward speed, a shiftable reaction member carried by said housing, cooperating gear teeth on said reaction member and one of said rotatable members, manually operable means for moving said reaction member into interlocking engagement with said last mentioned rotatable member, an anti-creep brake frictionally engageable with one of said rotatable members to retard the same, and automatically operated means for applying said brake at idling speeds and for releasing said brake at higher speeds.

2. The structure of claim 1 which is further characterized in that said shiftable reaction member comprises a yoke adapted to embrace said last mentioned rotatable member and having a series of gear teeth on opposite sides thereof engageable with the gear teeth on said last mentioned rotatable member to positively hold the latter against rotation.

3. The structure of claim 1 which is further characterized in that said automatically operated means for applying the anti-creep brake comprises an expansible chamber operatively connected to said brake, a source of vacuum power for said chamber, and an accelerator controlled valve for automatically regulating the admission of vacuum power to said chamber, said valve admitting vacuum power to said chamber at idling speeds and cutting off said vacuum power at speeds above idling speed.

4. In a variable speed power transmission, in combination, a housing, a power shaft and a load shaft, a hydraulic unit arranged to transmit torque between said power and load shafts, a multiple planetary gearing system interposed between said power and load shafts, means associated with said planetary gearing system automatically operable under predetermined conditions to change from one speed ratio to another, a rotatable member associated with said planetary gearing system and adapted when retarded to condition said planetary gearing system to transmit torque in reverse speed, a second rotatable member associated with said planetary gearing system and adapted when retarded to condition said planetary gearing system to transmit torque in forward speed, a pair of shiftable reaction members carried by said housing adjacent said first and second rotatable members, cooperating gear teeth on said reaction members and said rotatable members, means interconnecting said reaction members, manually operated means for selectively shifting said reaction members into interlocking engagement with their respective rotatable members to selectively place said transmission in forward and reverse speeds, an anti-creep brake frictionally engageable with one of said rotatable members, and means automatically applying said brake at idling speed to prevent creep in the transmission due to said fluid coupling and to retard said last mentioned rotatable member to facilitate shifting said reaction member into interlocking engagement therewith.

5. The structure of claim 4 which is further characterized in that means are provided movable in relation to the movement of said reaction members to modify the operation of said anti-creep brake to release the latter as one of said reaction members is shifted into interlocking engagement with its respective rotatable member.

6. The structure of claim 4 which is further characterized in that means are provided movable in relation to the movement of said reaction members to modify the operation of said anti-creep brake to momentarily release the latter as one of said reaction members is shifted into interlocking engagement with its respective rotatable member, permitting a slight angular movement of said last mentioned rotatable member to align the gear teeth on said last mentioned reaction and rotatable members, said means thereafter operating to again apply said brake to prevent creep.

7. In a variable speed power transmission, in combination, a housing, a power shaft, an intermediate shaft and a load shaft, a hydraulic unit having a power receiving element fixed for rotation with said power shaft and a power delivery element having a driving connection with said intermediate shaft, a multiple planetary gearing system interposed between said intermediate and load shafts, a rotatable power transmitting member between said fluid coupling and said planetary gearing system and adapted when held stationary to condition said planetary gearing system to transmit torque in reverse speed, an overrunning clutch arranged to prevent rotation of an element of said planetary gearing system in one direction to condition the latter to transmit torque in forward speed, external gear teeth on the periphery of said power transmitting member and said overrunning clutch, a pair of pivotally mounted yokes having internal gear teeth engageable with the external gear teeth on said power transmitting member and said overrunning clutch, means interconnecting said yokes to obtain simultaneous pivotal movement, a manually operated shifting lever engageable with one of said yokes and movable between three indexed positions, said lever in one position disengaging both of said yokes and in each of the other two positions moving one of said yokes into interlocking engagement with the respective meshing gear teeth to selectively hold stationary said power transmitting member and said overrunning clutch.

8. In a variable speed power transmission, in combination, a housing, a power shaft and a load shaft, a multiple planetary gearing system interposed between said power and load shafts, means associated with said planetary gearing system automatically operable under predetermined conditions to change from one speed ratio to another, a rotatable member associated with said planetary gearing system and adapted when retarded to condition said planetary gearing system to transmit torque in one direction, external gear teeth on said member, a torque reaction yoke having one end mounted on said housing for pivotal movement, said yoke being adapted in one angular position to embrace said member and having diametrically opposed internal gear teeth engageable with the external gear teeth on said member to lock the latter against rotation, and manually operated means arranged to shifting said yoke.

9. The structure of claim 8 which is further characterized in that one end of said yoke is bifurcated with the free ends of the furcations having spherical portions pivotally received in sockets formed in said housing.

10. The structure of claim 8 which is further characterized in that the pivotal mounting for said yoke is substantially in the plane of the teeth on said member to permit swinging movement of said yoke into and out of said plane, and guide means for guiding the opposite end of said yoke.

11. In a variable speed transmission having power and load shafts and a hydraulic power transmitting unit between said shafts, an anti-creep brake comprising a power transmitting member interposed between said power and load shafts, brake friction means engageable with said power transmitting member, vacuum operated means for applying said brake friction means, a valve body having a vacuum inlet and an atmospheric inlet, said valve body having a passage leading therefrom and communicating with said vacuum operated means, an accelerator controlled valve cooperating with said valve body and movable from an idling position establishing communication between said vacuum inlet and said passage and applying said brake friction means to said power transmitting member to a position at higher speeds establishing communication between said atmospheric inlet and said passage to release said brake friction means.

12. In a variable speed transmission having power and load shafts and a hydraulic power transmitting unit between said shafts, an anti-creep brake comprising a power transmitting member interposed between said power and load shafts, brake friction means engageable with said power transmitting member, vacuum operated means for applying said brake friction means, a valve body having a vacuum inlet and an atmospheric inlet, said valve body having a passage leading therefrom and communicating with said vacuum operated means, an accelerator controlled valve in said valve body having a cavity establishing communication between said passage and one of said inlets, said inlets being enlarged adjacent said valve to establish and break communication with said valve cavity rapidly with a small movement of said valve.

13. In a variable speed transmission having power and load shafts and a hydraulic power transmitting unit between said shafts, an anti-creep brake comprising a power transmitting member interposed between said power and load shafts, brake friction means engageable with said power transmitting member, a valve body adjacent said brake friction means, said valve body having an expansible vacuum chamber with a movable element therein operatively connected to said brake friction means, said valve body also having a flat face portion with a vacuum inlet and an atmospheric inlet opening into said face and a passage leading from said face to said vacuum chamber, and a flat angularly movable valve mounted adjacent said face and having a circumferentially extending cavity therein establishing communication between said passage and said inlets.

14. The structure of claim 13 which is further characterized in that said inlets are enlarged adjacent said face and having radially extending sides, said cavity also having radially extending sides so that a relatively small angular overlap between said cavity and one of said inlets provides a relatively large area of communication therebetween.

15. In a variable speed power transmission, in combination, a housing, a power shaft and a load shaft, a hydraulic unit arranged to transmit torque between said power and load shafts, a multiple planetary gearing system interposed between said power and load shafts, means associated with said planetary gearing system automatically operable under predetermined conditions to change from one speed ratio to another, a power transmitting member associated with said planetary gearing system, an anti-creep brake frictionally engageable with said power transmitting member, accelerator operated linkage for controlling said anti-creep brake and arranged to apply said brake at idling speeds and to release said brake at higher speeds, manually controlled means for shifting said planetary gearing system between neutral, forward and reverse speed, a cam associated with said manually controlled means and movable in conjunction therewith, and a lever actuated by said cam and arranged to actuate a part of said linkage to release the anti-creep brake as the planetary gearing system is shifted either to forward or reverse speed.

16. In a variable speed power transmission, in combination, a housing, a power shaft and a load shaft, a multiple planetary gearing system interposed between said power and load shafts, means associated with said planetary gearing system automatically operable under predetermined conditions to change from one speed ratio to another, a rotatable member associated with said planetary gearing system and adapted when retarded to condition said planetary gearing system to transmit torque in forward speed, a second rotatable member associated with said planetary gearing system and adapted when retarded to condition said planetary gearing system to transmit torque in reverse speed, a series of external gear teeth extending completely around the periphery of one of said rotatable members, a yoke mounted upon said housing for angular movement about an axis extending generally normal to the axis of rotation of said last-mentioned rotatable member and located radially beyond the periphery thereof, said yoke having a U-shaped portion embracing said last-mentioned rotatable member and provided with several internal gear teeth at the free end of each leg of the U-shaped portion, said last-mentioned gear teeth being located on diametrically opposite sides of the axis of said last-mentioned rotatable member and arranged to mesh with the external gear teeth on said last-mentioned rotatable member, and means for angularly moving said yoke about the pivotal axis thereof to swing the internal gear teeth thereon into and out of mesh with the external gear teeth on said last-mentioned rotatable member.

17. The structure defined by claim 16 which is further characterized in that the free end of each leg of the U-shaped portion of said yoke is provided with a guideway extending generally transversely of the plane of said yoke, and a pair of guide members fixedly mounted upon said housing on opposite sides of said second mentioned rotatable member and engageable with said guideways in said yoke to guide the latter during its angular movement.

EUGENE J. FARKAS

REFERENCES CITED

The following references are of record in the file of this patent:

UNITED STATES PATENTS

| Number | Name | Date |
|---|---|---|
| 2,171,534 | Banker | Sept. 5, 1939 |
| 2,298,648 | Russell | Oct. 13, 1942 |
| 2,309,051 | Dodge | Nov. 9, 1943 |
| 2,324,693 | Griswold | July 20, 1943 |
| 2,335,255 | Banker | Nov. 30, 1943 |
| 2,381,772 | Pentz | Aug. 7, 1945 |
| 2,414,832 | Orr | Jan. 28, 1947 |